(12) United States Patent
Bourassa et al.

(10) Patent No.: US 9,249,730 B2
(45) Date of Patent: Feb. 2, 2016

(54) INTEGRATED INDUCER HEAT EXCHANGER FOR GAS TURBINES

(71) Applicant: General Electric Company, Schenectady, NY (US)

(72) Inventors: Corey Bourassa, Mechanicville, NY (US); William Dwight Gerstler, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 384 days.

(21) Appl. No.: 13/755,500

(22) Filed: Jan. 31, 2013

(65) Prior Publication Data

US 2014/0208769 A1    Jul. 31, 2014

(51) Int. Cl.
*F02C 7/18* (2006.01)
*F01D 5/18* (2006.01)
*F28F 13/06* (2006.01)
*F28D 7/00* (2006.01)
*F28D 21/00* (2006.01)

(52) U.S. Cl.
CPC ............... *F02C 7/185* (2013.01); *F01D 5/189* (2013.01); *F28D 7/0058* (2013.01); *F28F 13/06* (2013.01); *F05D 2240/129* (2013.01); *F05D 2250/185* (2013.01); *F05D 2260/201* (2013.01); *F05D 2260/213* (2013.01); *F28D 2021/0026* (2013.01); *F28F 2250/02* (2013.01)

(58) Field of Classification Search
CPC .............. F02C 7/16; F02C 7/18; F01D 25/12; Y02T 50/675; Y02T 50/676
See application file for complete search history.

(56) References Cited

U.S. PATENT DOCUMENTS

| | | | |
|---|---|---|---|
| 3,756,020 A * | 9/1973 | Moskowitz et al. | ............ 60/760 |
| 5,340,274 A | 8/1994 | Cunha | |
| 6,405,520 B1 | 6/2002 | Thiel et al. | |
| 6,560,966 B1 | 5/2003 | Fetescu et al. | |
| 6,792,762 B1 | 9/2004 | Yamanaka et al. | |
| 7,300,251 B2 | 11/2007 | Kitamura et al. | |
| 7,555,892 B2 | 7/2009 | Vosberg | |
| 7,607,307 B2 * | 10/2009 | Bergholz | ........................ 60/775 |
| 7,870,743 B2 * | 1/2011 | Lee et al. | ........................ 60/782 |
| 8,181,443 B2 | 5/2012 | Rago | |
| 2005/0241320 A1 | 11/2005 | Blonn et al. | |
| 2010/0303635 A1 | 12/2010 | Townes et al. | |

OTHER PUBLICATIONS

Cerri et al., "Advances in effusive cooling techniques of gas turbines", Applied Thermal Engineering, vol. 27, Issue 4, Mar. 2007, pp. 692-698.

* cited by examiner

*Primary Examiner* — Craig Kim
(74) *Attorney, Agent, or Firm* — Pabrita K. Chakrabarti (57) ABSTRACT

An integrated inducer heat exchanger is provided. The integrated inducer heat exchanger includes multiple airfoil devices disposed in an annular array within an inner circular casing and an outer circular casing forming multiple passages for allowing a flow of fluid from a forward side to an aft side of the integrated inducer heat exchanger. The integrated inducer heat exchanger also includes multiple annular manifolds arranged about the outer circular casing configured for supplying a flow of coolant at low temperature from one or more coolant sources and returning the flow of coolant at high temperature to the one or more coolant sources via an external heat exchanger for dissipating heat and multiple transfer tubes connecting the multiple annular manifolds with the multiple airfoil devices for transferring the flow of coolant within the airfoil devices for exchanging heat between the coolant and the fluid passing through the multiple passages.

18 Claims, 7 Drawing Sheets

INTEGRATED INDUCER HEAT EXCHANGER FOR GAS TURBINES

BACKGROUND

The present application relates generally to gas turbines and more particularly relates to cooling systems with integrated inducer heat exchangers for gas turbines.

Gas turbines components require cooling downstream of a combustor since hot gas path temperatures may exceed a temperature of 2500° F. Typically, a gas turbine utilizes compressor discharge and compressor bleed air to cool the high pressure turbine components. For rotor and blade cooling, the cooling air is routed from the compressor to the inner radius of the rotor and bled into the rotor cavity between the rotor and stationary wall of the stationary nozzle where it is mixed into the rotating air. This mixing can lead to losses and temperature increases in the cooling air, so an inducer or pre-swirler is used prior to the cooling air entering the rotor cavity for inducing a rotational velocity, or swirling motion, of the cooling air, thereby causing the cooling air to match a speed equivalent to the air already moving in the rotor cavity thereby reducing mixing losses and preventing large temperature increases of the cooling air. As the overall pressure ratio of the gas turbines continues to increase to improve performance, the compressor discharge and bleed air temperatures also increase. The increased temperatures may require use of high temperature tolerant rotor materials that are expensive. The increased temperatures may also require more air to be used to cool turbine components, thereby negatively impacting performance of the gas turbines. One method to minimize the amount of flow of the compressor discharge or bleed air is to utilize one or more heat exchangers for cooling the flow of the compressor discharge or bleed air. However, the use of heat exchangers adds cost, weight, and complexity to the gas turbine.

Therefore, there exists a need to implement a cooling system and a method for improved cooling of the gas turbines without negatively affecting the overall efficiency of the gas turbine while being durable and inexpensive to fabricate.

BRIEF DESCRIPTION

In accordance with an embodiment of the invention, an integrated inducer heat exchanger is provided. The integrated inducer heat exchanger includes multiple airfoil devices disposed in an annular array within an inner circular casing and an outer circular casing forming multiple passages for allowing a flow of fluid from a forward side to an aft side of the integrated inducer heat exchanger. The integrated inducer heat exchanger also includes multiple annular manifolds arranged about the outer circular casing configured for supplying a flow of coolant at low temperature from one or more coolant sources and returning the flow of coolant at high temperature to the one or more coolant sources via one or more external heat exchangers for dissipating heat. Further, the integrated inducer heat exchanger includes multiple transfer tubes connecting the multiple annular manifolds with the plurality of airfoil devices for transferring the flow of coolant within the airfoil devices for exchanging heat between the flow of coolant and the flow of fluid passing through multiple passages.

In accordance with an embodiment of the invention, a cooling system for a gas turbine is provided. The cooling system includes one or more coolant sources for supplying one or more flows of coolant and one or more integrated inducer heat exchangers located in one or more high pressure turbine stages for swirling and cooling one or more flows of fluid being used for cooling turbine components. Each of the integrated inducer heat exchanger includes an internal flow circuit for the flow of coolant and an external flow circuit for the flow of fluid. The cooling system further includes a pump for pumping the flow of coolant into the one or more integrated inducer heat exchangers located in the gas turbine and one or more external heat exchangers for removing heat from the flow of coolant. Furthermore, the cooling system includes a control subsystem configured to maximize efficiency at each high pressure turbine stage by tuning the respective flow of coolant from the one or more coolant sources into the integrated inducer heat exchanger and attaining an optimal cooling amount for the flow of fluid required for the corresponding high pressure turbine stage.

In accordance with an embodiment of the invention, a method of cooling gas turbine components is provided. The method includes supplying one or more flows of coolant through an internal flow circuit of each one of a plurality of integrated inducer heat exchangers located in one or more high pressure turbine stages. The method also includes providing one or more flows of fluid through an external flow circuit of each of the plurality of integrated inducer heat exchangers for swirling and cooling the fluid due to heat exchange with the coolant before directing into regions with hot gas turbine components. Further, the method includes controlling the flow of coolant from the coolant source into the plurality of integrated inducer heat exchangers and attaining an optimal cooling amount for the flow of fluid required for the corresponding high pressure turbine stage using a control subsystem.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
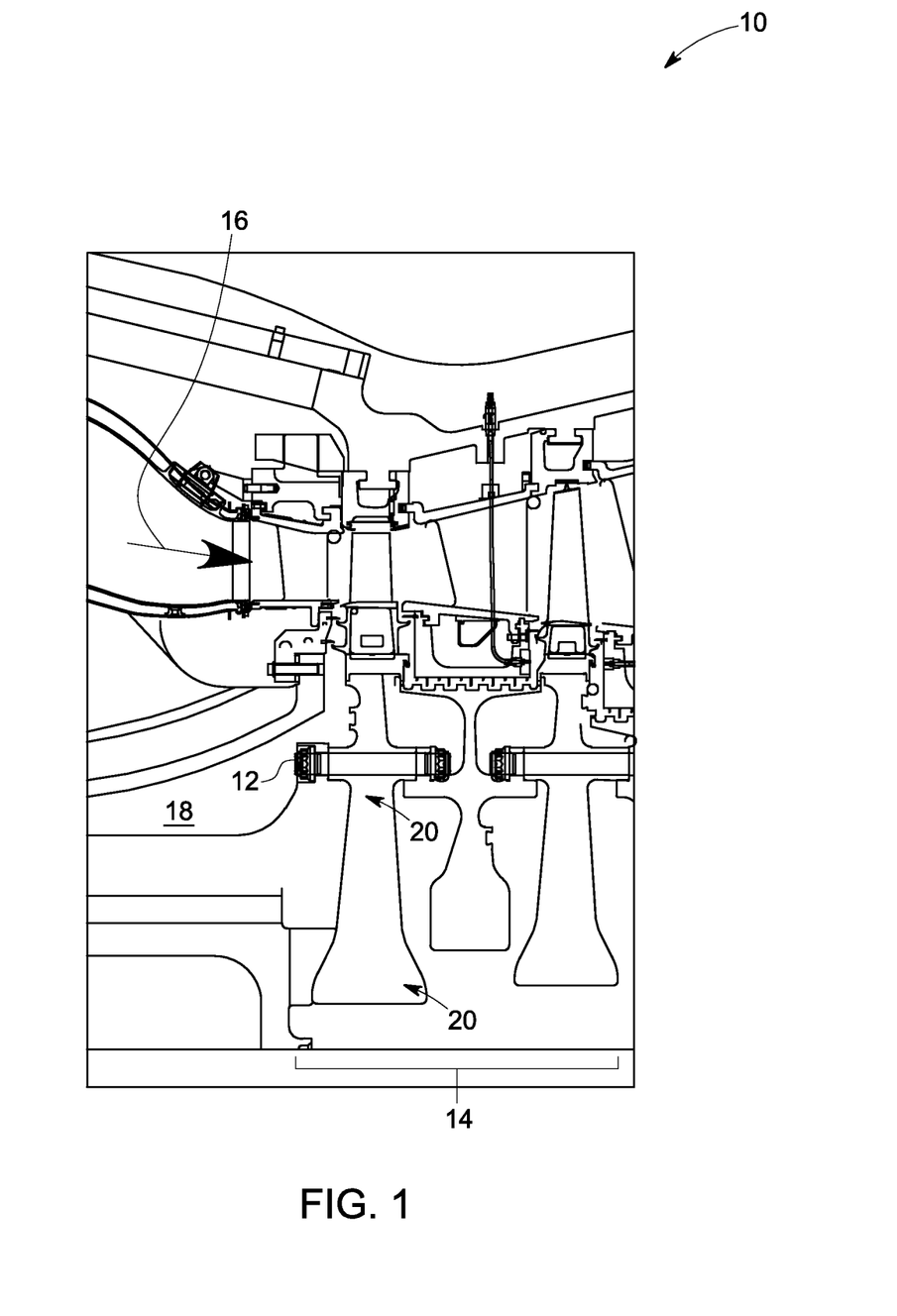
FIG. 1 is a partial schematic representation of a gas turbine including an integrated inducer heat exchanger in accordance with an embodiment of the present invention.

FIG. 1 is a partial schematic representation of a gas turbine 10 including an integrated inducer heat exchanger 12 for cooling turbine components in accordance with an embodiment of the invention. The gas turbine 10 includes a compressor (not shown), a combustor (not shown) and a turbine section 14. In operation of the gas turbine 10, an incoming gas flow 16 enters the turbine section 14 from the combustor. The turbine section 14 receives the incoming gas flow 16 and extracts kinetic energy from the incoming gas flow 16. The integrated inducer heat exchanger 12 is situated between a bleed air plenum 18 and a rotor cavity 20 for directing a flow of fluid with reduced temperature into the rotor cavity 20 for cooling the high pressure turbine rotors and blades. Non-limiting examples of the flow of fluid include a compressor discharged fluid or a bleed air or a compressed ambient air.

Figure 2:
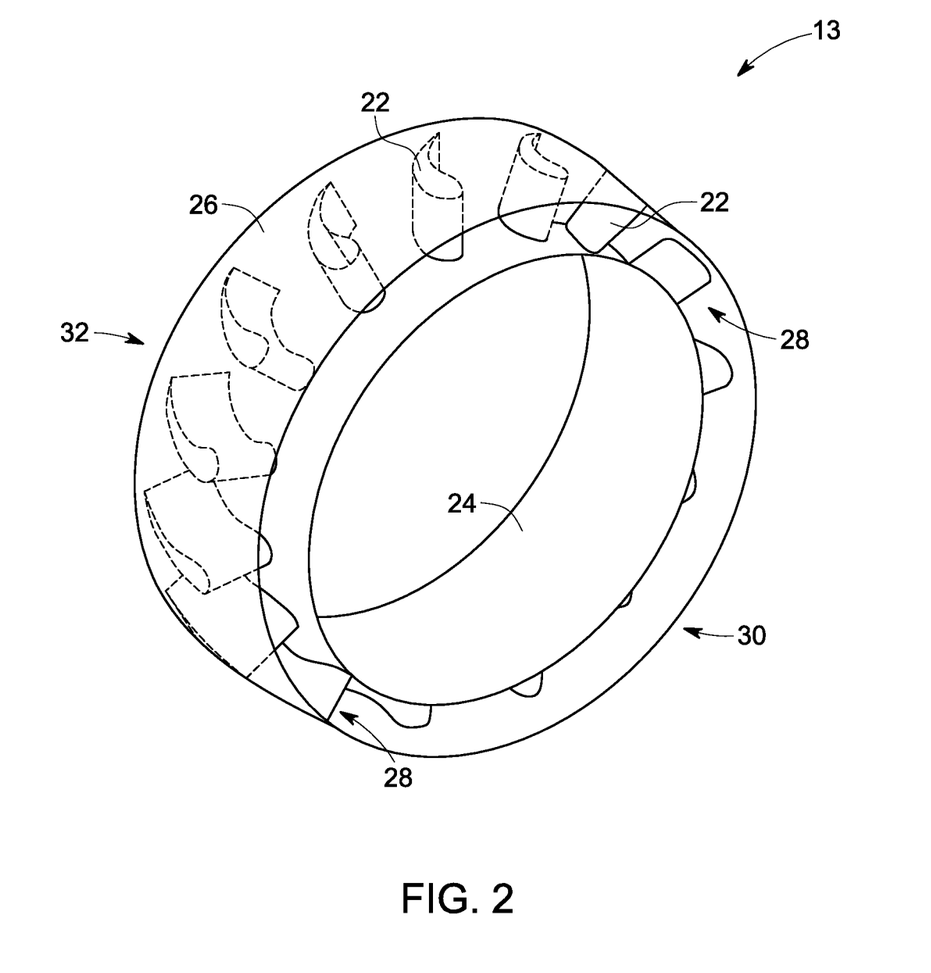
FIG. 2 is a perspective view of an inducer of an integrated inducer heat exchanger in accordance with an embodiment of the present invention.

FIG. 2 is a perspective view of an inducer 13 of the integrated inducer heat exchanger 12 in accordance with an embodiment of the present invention. The inducer 13 includes multiple airfoil devices 22 disposed in an annular array within an inner circular casing 24 and an outer circular casing 26 forming multiple passages 28 for allowing the flow of fluid from the bleed air plenum 18 (shown in FIG. 1) at a forward side 30 into the rotor cavity 20 (shown in FIG. 1) at an aft side 32 of the inducer 13. Each of the multiple airfoil devices 22 helps to pre-swirl the flow of fluid passing through the multiple passages 28 prior to entering the rotor cavity 20. The pre-swirling of the flow of fluid causes flow speed of the fluid to nearly attain a rotating speed of gases in the rotor cavity 20. This reduces mixing losses. Further, during the flow of fluid through the multiple passages 28, the airfoil shape of the airfoil devices 22 causes formation of thermal boundary layers and thermal wakes at the surfaces and trailing edges of the each airfoil device 22 that leads to reduction in temperature of the flow of fluid. Furthermore, the inducer 13 of the rotor cavity 20 (as shown in FIG. 1) enables cooling of the flow of fluid by allowing heat transfer to a flow of coolant (not shown) within the airfoil devices 22 in accordance with an embodiment of the present invention.

Figure 3:
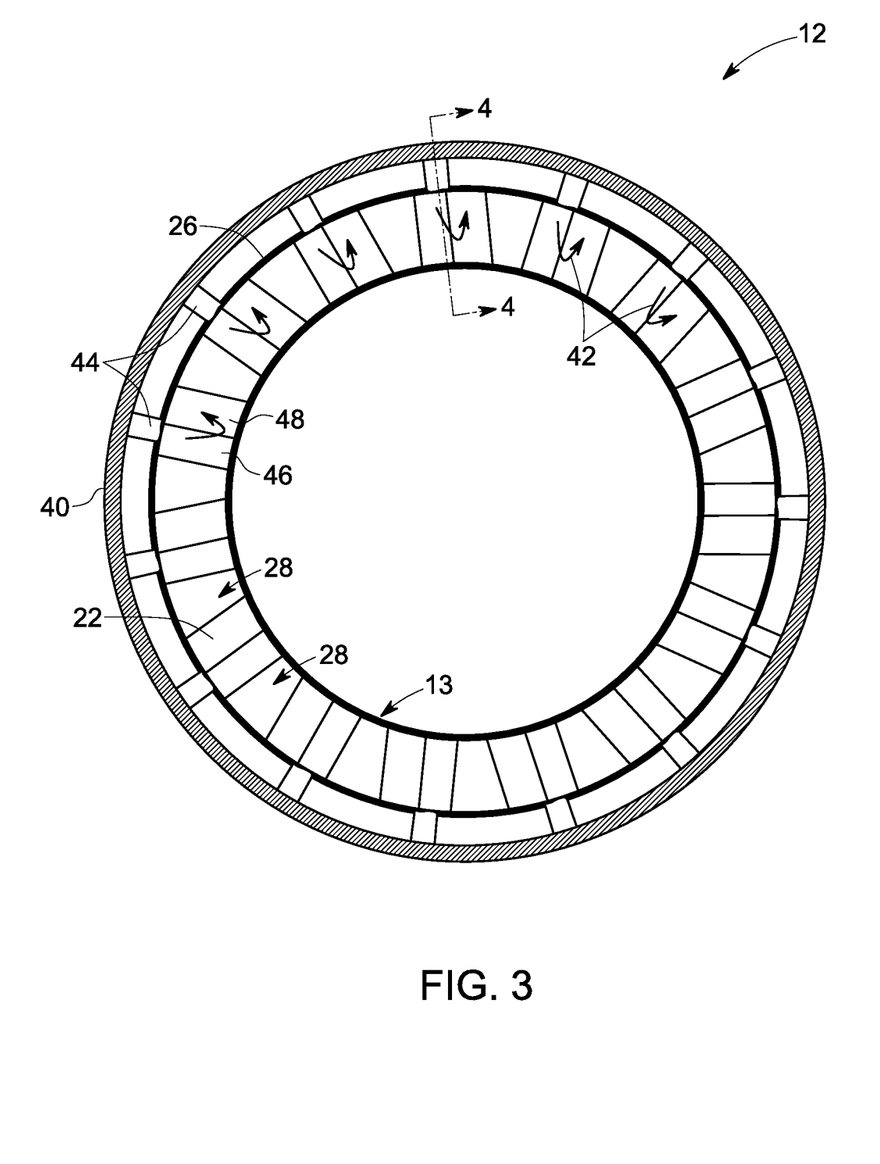
FIG. 3 is a side view of the integrated inducer heat exchanger in accordance with an embodiment of the present invention.

FIG. 3 is a side view of the integrated inducer heat exchanger 12 configured for cooling the flow of fluid prior to entering the rotor cavity 20 (as shown in FIG. 1) in accordance with an embodiment of the present invention. The integrated inducer heat exchanger 12 includes the inducer 13 as shown in FIG. 2 and multiple annular manifolds 40 arranged about the outer circular casing 26 configured for supplying a flow of coolant 42 at low temperature from one or more coolant sources (not shown) and returning the flow of coolant 42 at high temperature to the one or more coolant sources via one or more external heat exchangers (not shown) for dissipating heat. It is to be noted that the multiple annular manifolds 40 include separate supply and discharge manifolds (shown in FIG. 4 as cold heat-exchange supply manifold 52 and warm heat-exchange supply manifold 54 respectively). The integrated inducer heat exchanger 12 also includes multiple transfer tubes 44 connecting the multiple annular manifolds 40 with the multiple airfoil devices 22 for transferring the flow of coolant 42 within the airfoil devices 22 for exchanging heat between the flow of coolant 42 and the flow of fluid passing through the multiple passages 28. The multiple transfer tubes 44 also includes both supply and discharge tubes (referred as forward most transfer tubes 56 and aft most transfer tubes 58 respectively in FIG. 4). As shown in FIG. 3, the coolant 42 flows into each of the airfoil devices 22 at a leading edge 46 first and then flows out of each of the airfoil devices 22 from the trailing edge 48. This direction of flow of coolant 42 within the airfoil devices 22 ensures that maximum heat is extracted from the flow of fluid during heat exchange between the flow of coolant 42 and the flow of fluid through the multiple passages 28. Further, after the heat exchange within the airfoil devices 22, the flow of coolants at different temperatures in the multiple annular manifolds 40 are in opposite directions according to one embodiment. In one embodiment, the coolant includes a liquid coolant. In another embodiment, the coolant may include a phase change coolant. Further, non-limiting examples of the coolant may include a compressor bleed air, a flow of steam, a gaseous fuel or a liquid fuel.

Figure 4:
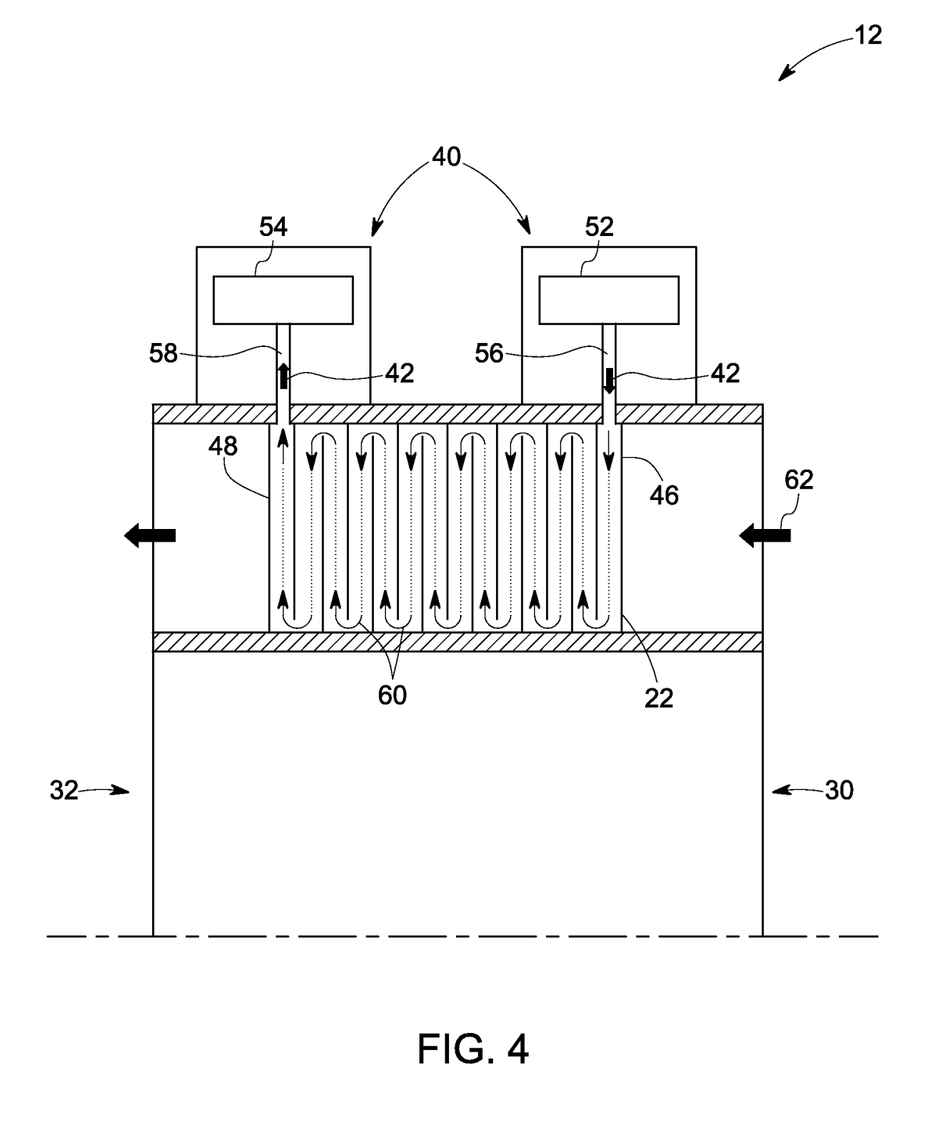
FIG. 4 shows a cross-section view of a portion of the integrated inducer heat exchanger in accordance with an embodiment of the present invention.

FIG. 4 shows a cross-section view 4-4 (as shown in FIG. 3) of a portion of the integrated inducer heat exchanger 12 in accordance with an embodiment of the present invention. The multiple annular manifolds 40 include a cold heat-exchange supply manifold 52 towards the forward side 30 carrying the flow of coolant 42 at low temperature and a warm heat-exchange return manifold 54 towards the aft side 32 of the inducer heat exchanger 12 carrying the flow of coolant 42 at high temperature. As shown, the cold heat-exchange supply manifold 52 is in a fluid communication with the leading edge 46 of each of the airfoil devices 22 via multiple forward most transfer tubes 56. The warm heat-exchange return manifold 54 is in a fluid communication with the trailing edge 48 of each of the airfoil devices 22 via a plurality of aft most transfer tubes 58. In one embodiment, the cold heat-exchange supply manifold 52 includes one or more inlet ports (not shown) for supply of the coolant at low temperature. Similarly, the warm heat-exchange supply manifold 54 includes one or more outlet ports (not shown) for return of the coolant at high temperature.

In this embodiment as shown in FIG. 4, each of the multiple airfoil devices 22 comprises multiple serpentine paths 60 for allowing the flow of coolant 42 at low temperature from the leading edge 46 towards the trailing edge 48 of the airfoil device 22. The multiple serpentine paths 60 allows increased contact of the coolant 42 with surfaces of the airfoil device causing higher heat exchange with a flow of fluid 62 passing through multiple passages 28 (as shown in FIG. 3) in contact with outer surfaces of the airfoil devices 22. In one embodiment, the multiple serpentine paths 60 form a serpentine flow circuit proximate to the wall of the airfoil device for near wall cooling of the flow of fluid 62.

Figure 5:
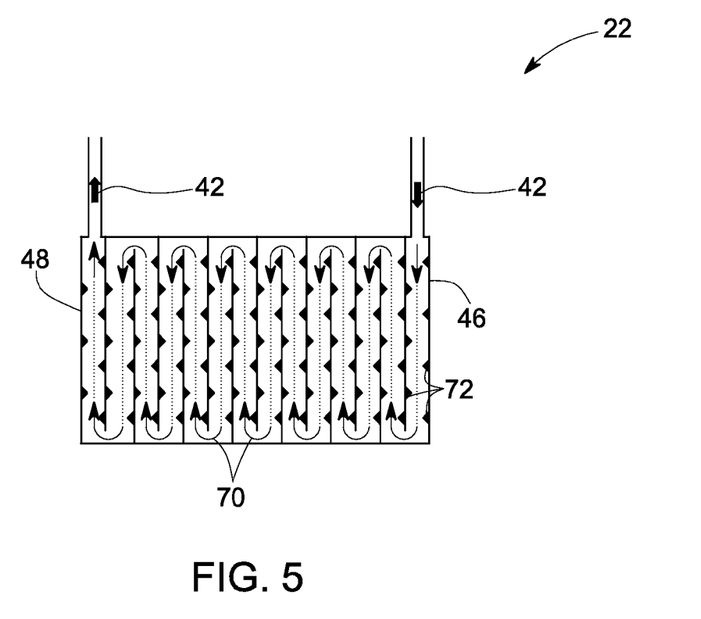
FIG. 5 shows a sectional view of an airfoil device of the integrated inducer heat exchanger in accordance with an embodiment of the present invention.

FIG. 5 shows a sectional view of an airfoil device 22 of the integrated inducer heat exchanger 12 in accordance with an embodiment of the present invention. Each of the multiple airfoil devices 22 includes a plurality of serpentine paths 70 having multiple turbulence generators 72 to increase the heat transfer between the inner walls of the paths and the flow of the coolant 42. Such multiple turbulence generators 72 cause turbulence in the flow of the coolant 42 and thereby, increase the heat transfer of the coolant flow 42 with the inner walls of the paths enhancing heat exchange between the coolant and the flow of fluid outside the airfoil devices 22.

Figure 6:
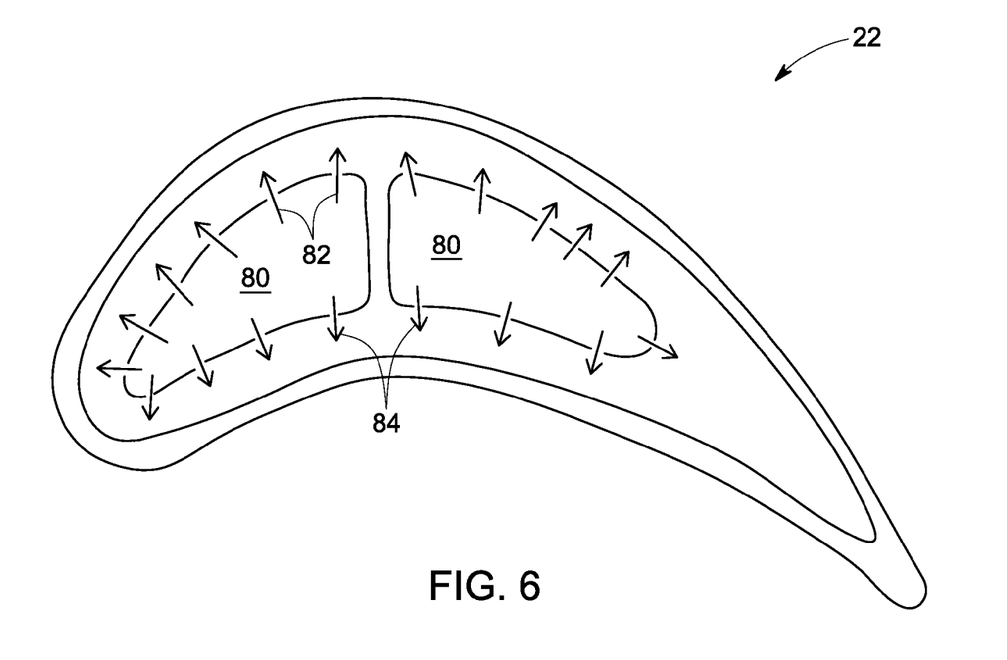
FIG. 6 shows a sectional view of an airfoil device of an integrated inducer heat exchanger with impingement cooling mechanism in accordance with an embodiment of the present invention.

FIG. 6 shows a sectional view of the airfoil device 22 of the integrated inducer heat exchanger 12 in accordance with an embodiment of the present invention. As shown, each of the multiple airfoil devices 22 includes one or more airfoil blocks 80 that are in fluid communication with transfer tubes 56, 58 (as shown in FIG. 4) for allowing flow of coolant 42. The airfoil blocks 80 includes an array of impingement holes 82 that are configured to impinge jets of coolant 84 at inner surface of the airfoil device 22 and thereby, increasing the heat transfer from the coolant flow to the walls and thereby reducing the temperature of the flow of fluid on the outer surfaces of the airfoil devices 22.

Figure 7:
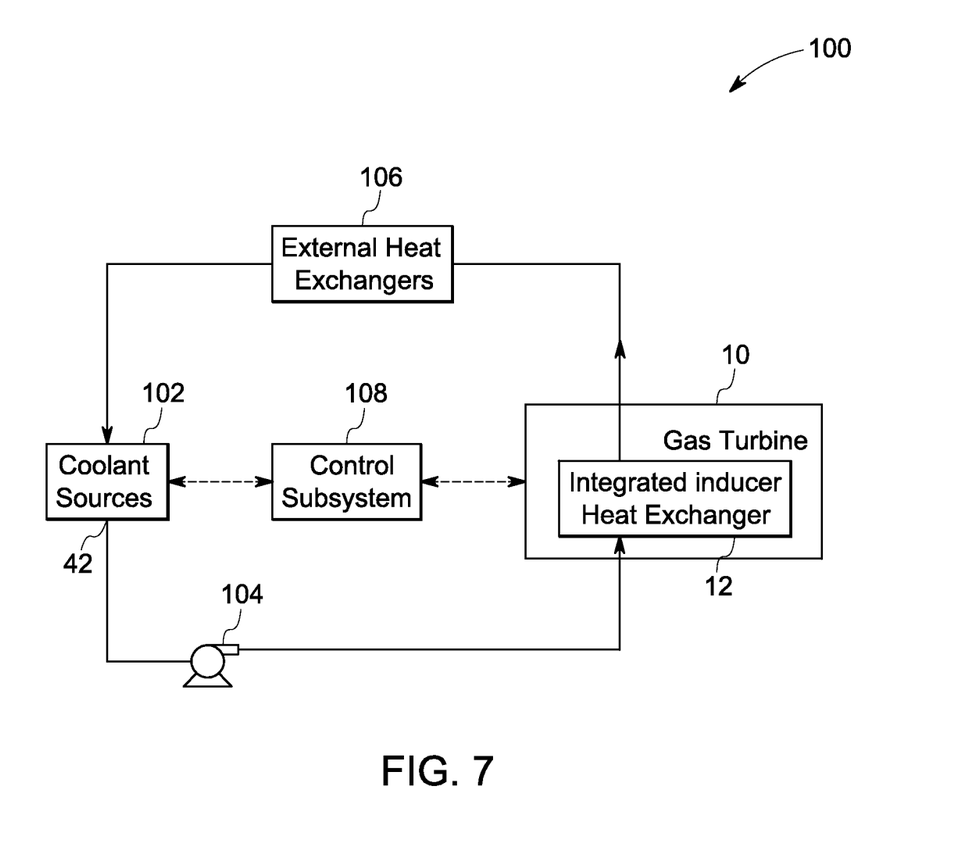
FIG. 7 shows a schematic view of a cooling system for a gas turbine in accordance with an embodiment of the present invention.

FIG. 7 shows a schematic view of a cooling system 100 for a gas turbine 10 in accordance with an embodiment of the present invention. As shown, the cooling system 100 includes one or more coolant sources 102 for supplying one or more flows of coolant 42 (shown in FIG. 3 and FIG. 4). The cooling system 100 includes one or more integrated inducer heat exchangers 12 (shown in FIG. 3) located in one or more high pressure turbine stages of the gas turbine 10 for swirling and cooling one or more flows of fluid being used for cooling turbine components. Each of the integrated inducer heat exchanger 12 comprises an internal flow circuit for the flow of coolant 42 and an external flow circuit for the flow of fluid. Further, the cooling system 100 includes a pump 104 for pumping the flow of coolant 42 into the one or more integrated inducer heat exchangers 12 located in the gas turbine 10. After removal of heat from the flow of fluid, the flow of coolant 42 carrying the extracted heat is directed back to the one or more coolant sources 102 via one or more external heat exchangers 106. Each of the one or more external heat exchangers 106 may use a cooling fluid for removing the extracted heat from the flow of coolant 42. Non-limiting examples of the cooling fluid may include air or water. Furthermore, the cooling system 100 includes a control subsystem 108 that is configured to maximize efficiency at each high pressure turbine stage of the gas turbine 10 by tuning the respective flow of coolant 42 from the coolant source into the one or more integrated inducer heat exchangers 12 and attaining an optimal cooling amount for the flow of fluid required for the corresponding high pressure turbine stage.

In one embodiment, the control subsystem 108 is further configured to increase operational flexibility by selecting a coolant source out of the one or more coolant sources 102 and tune an optimal amount of flow of coolant into the integrated inducer heat exchanger. Thus, the control subsystem 108 is also configured to attain an optimal cooling amount required for the corresponding high pressure turbine stage based on optimization of a cycle performance, availability of coolant sources and cost of the flow of fluid and coolant used in the cooling system. The control subsystem 108 may include a processor configured to receive flow data from manifolds carrying the coolants or cooling fluids and temperature data from the different high pressure turbine stages of the gas turbine and analyze the flow and temperature data for high operational flexibility and efficiency and thereby provide instructions for controlling various control valve devices located in the cooling system 100. It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the processor may be equipped with a combination of hardware and software for performing the tasks of the invention, as will be understood by those skilled in the art.

Figure 8:
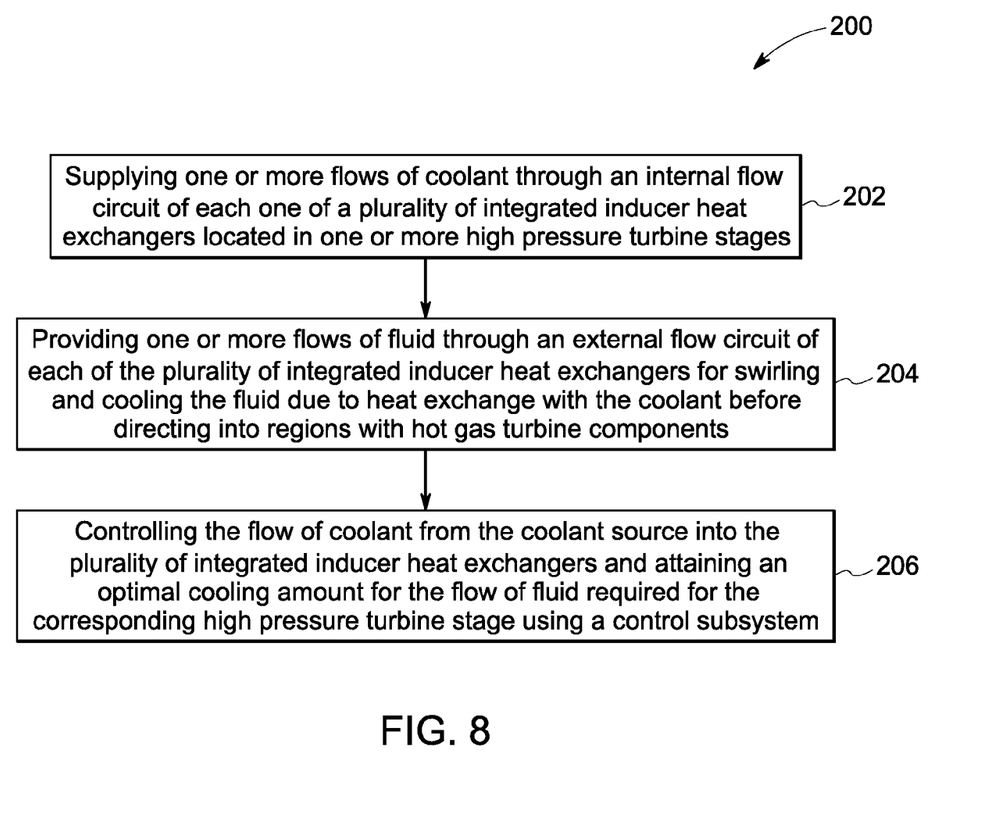
FIG. 8 is flow chart of a method of cooling gas turbine components in accordance with an embodiment of the present invention.

FIG. 8 is flow chart 200 of a method of cooling gas turbine components in accordance with an embodiment of the present invention. At step 202, the method includes supplying one or more flows of coolant through an internal flow circuit of each one of a plurality of integrated inducer heat exchangers located in one or more high pressure turbine stages. At step 204, the method includes providing one or more flows of fluid through an external flow circuit of each of the plurality of integrated inducer heat exchangers for swirling and cooling the fluid due to heat exchange with the coolant before directing into regions with hot gas turbine components. Further, at step 206, the method includes controlling the flow of coolant from the coolant source into the plurality of integrated inducer heat exchangers and attaining an optimal cooling amount for the flow of fluid required for the corresponding high pressure turbine stage using a control subsystem. In one embodiment, the method also includes selecting a coolant source, tuning an optimal amount of flow of coolant into the integrated inducer heat exchanger and attaining an optimal cooling amount required for the corresponding high pressure turbine stage based on optimization of a cycle performance, availability of coolant sources and cost of the flow of fluid and coolant used in the cooling system.

Advantageously, the present invention provides cooled cooling air via "on board" or in situ solution to gas turbines that may not require a separate heat exchanger system external to the gas turbine. Also, in one embodiment, the present invention enables each high pressure turbine stage to use a separate integrated inducer heat exchanger and the coolant source and cooling amount can be tuned at each stage for improving efficiency and operational flexibility. Further, the cooled cooling air eliminates the need to use expensive rotor materials reducing material costs of the gas turbine. Thus, the current invention enables reduction in cost, weight and complexity of the gas turbine due to the use of integrated inducer heat exchanger required for cooling turbine components during operation.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be described or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An integrated inducer heat exchanger comprising:
a plurality of airfoil devices disposed in an annular array within an inner circular casing and an outer circular casing forming a plurality of passages for allowing a flow of fluid from a forward side to an aft side of the integrated inducer heat exchanger, wherein each of the plurality of airfoil devices within the integrated inducer heat exchanger pre-swirl the flow of fluid passing through the plurality of passages before the flow of fluid enters into regions with hot gas turbine components;
a plurality of annular manifolds arranged about the outer circular casing configured for supplying a flow of cool- ant at low temperature from one or more coolant sources and returning the flow of coolant at high temperature to the one or more coolant sources via one or more external heat exchangers for dissipating heat; and a plurality of transfer tubes connecting the plurality of annular manifolds with the plurality of airfoil devices for transferring the flow of coolant within the airfoil devices for exchanging heat between the flow of coolant and the flow of fluid passing through the plurality of passages.

2. The inducer heat exchanger of claim 1, wherein the plurality of annular manifolds comprises a cold heat-exchange supply manifold towards the forward side and a warm heat-exchange return manifold towards the aft side of the inducer heat exchanger.

3. The inducer heat exchanger of claim 2, wherein the cold heat-exchange supply manifold is in a fluid communication with a leading edge of each of the airfoil devices via a plurality of forward most transfer tubes.

4. The inducer heat exchanger of claim 2, wherein the warm heat-exchange return manifold is in a fluid communication with a trailing edge of each of the airfoil devices via a plurality of aft most transfer tubes.

5. The inducer heat exchanger of claim 2, wherein the cold heat-exchange supply manifold and the warm-heat exchange return manifold carry a cold coolant and a warm coolant respectively in opposite directions.

6. The inducer heat exchanger of claim 5, wherein the cold heat-exchange supply manifold comprises one or more inlet ports for supply of the cold coolant.

7. The inducer heat exchanger of claim 5, wherein the warm heat-exchange supply manifold comprises one or more outlet ports for return of the warm coolant.

8. The inducer heat exchanger of claim 1, wherein each of the plurality of airfoil devices comprises a plurality of serpentine paths for allowing the flow of coolant from the forward side to the aft side of the inducer heat exchanger.

9. The inducer heat exchanger of claim 1, wherein each of the plurality of airfoil devices comprises a plurality of serpentine paths having multiple turbulence generators on the inner walls of the paths for generating turbulence during the flow of the coolant to enhance heat transfer from the coolant to the wall.

10. The inducer heat exchanger of claim 1, wherein each of the plurality of airfoil devices comprises an inner airfoil block with an array of impingement holes configured for impinging jets of coolant at inner surface of the airfoil device to enhance heat transfer from the coolant to the wall.

11. The inducer heat exchanger of claim 1, wherein each of the plurality of airfoil devices comprises a plurality of channels forming a serpentine flow circuit proximate to the wall of the airfoil device for near wall cooling.

12. The inducer heat exchanger of claim 1, wherein the coolant comprises a liquid coolant or a phase change coolant.

13. The inducer heat exchanger of claim 1, wherein the coolant comprises a compressor bleed air, a flow of steam, a gaseous fuel or a liquid fuel.

14. The inducer heat exchanger of claim 1, wherein the flow of fluid comprises a compressor discharged fluid or a bleed air or a compressed ambient air.

15. A cooling system for a gas turbine comprising:
one or more coolant sources for supplying one or more flows of coolant;
one or more integrated inducer heat exchangers located in one or more high pressure turbine stages for swirling and cooling one or more flows of fluid being used for cooling turbine components before the one or more flows of fluid enter into regions with hot gas turbine components, wherein each of the integrated inducer heat exchanger comprises an internal flow circuit for the flow of coolant and an external flow circuit for the flow of fluid;
a pump for pumping the flow of coolant into the one or more integrated inducer heat exchangers located in the gas turbine;
one or more external heat exchanger for removing heat from the flow of coolant; and
a control subsystem configured to maximize efficiency at each high pressure turbine stage by tuning the respective flow of coolant from the coolant source into the integrated inducer heat exchanger and attaining an optimal cooling amount for the flow of fluid required for the corresponding high pressure turbine stage.

16. The cooling system of claim 15, wherein the one or more integrated inducer heat exchanger comprises a plurality of airfoil devices disposed in an annular array within an inner circular casing and an outer circular casing forming the external flow circuit for allowing the flow of fluid through external passages from a forward side to an aft side of the integrated inducer heat exchanger.

17. The cooling system of claim 16, wherein the internal flow circuit of the each of the integrated inducer heat exchanger comprises a plurality of passages for the flow of coolant through a plurality of annular manifolds arranged about the outer circular casing into a plurality of serpentine paths within the plurality of airfoil devices via a plurality of transfer tubes.

18. The cooling system of claim 15, wherein the control subsystem is further configured to increase operational flexibility by selecting a coolant source, tuning an optimal amount of flow of coolant into the integrated inducer heat exchanger and attaining an optimal cooling amount required for the corresponding high pressure turbine stage based on optimization of a cycle performance, availability of coolant sources and cost of the flow of fluid and coolant used in the cooling system.

* * * * *